United States Patent [19]

Weaver et al.

[11] Patent Number: 4,562,248

[45] Date of Patent: Dec. 31, 1985

[54] AZO DYES FROM UNSUBSTITUTED OR SUBSTITUTED 3-AMINO-PYRIDINE AND ARYL OR HETEROCYCLIC COUPLERS

[75] Inventors: Max A. Weaver; Jean C. Fleischer, both of Kingsport, Tenn.

[73] Assignee: Eastman Kodak Company, Rochester, N.Y.

[21] Appl. No.: 554,866

[22] Filed: Nov. 25, 1983

[51] Int. Cl.[4] .................. C09B 29/036; C09B 29/36; C09B 29/42; C09B 29/46
[52] U.S. Cl. .................... 534/630; 534/752; 534/766; 534/770; 534/887; 534/768
[58] Field of Search ............. 260/156, 158, 152, 163, 260/165; 534/630, 766, 770, 752, 768

[56] References Cited

U.S. PATENT DOCUMENTS

| | | | |
|---|---|---|---|
| 2,294,380 | 9/1942 | Braker | 260/156 |
| 2,313,738 | 3/1943 | Dickey et al. | 260/156 X |
| 2,857,372 | 10/1958 | Straley et al. | 260/156 X |
| 2,864,813 | 12/1958 | Bossard et al. | 260/156 X |
| 3,312,681 | 4/1967 | Lewis | 260/156 |
| 3,337,290 | 8/1967 | Pons et al. | 260/156 X |
| 4,025,301 | 5/1977 | Lang | 260/156 X |
| 4,301,068 | 11/1981 | Giles et al. | 260/158 |
| 4,302,390 | 11/1981 | Giles et al. | 260/158 |
| 4,358,404 | 11/1982 | Chapman et al. | 260/156 |

OTHER PUBLICATIONS

Ginsberg et al., Index Chemicus, vol. 23, 69675 (1966).

Guser et al., Index Chemicus, vol. 27, 86189 (1967).

*Primary Examiner*—Floyd D. Higel
*Attorney, Agent, or Firm*—Donald W. Spurrell; Daniel B. Reece, III

[57] ABSTRACT

Azo dyes having the general formula

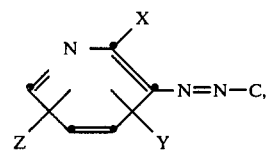

in which each of X, Y and Z are independently selected from H and a variety of substituents, preferably provided that at least one of X and Y is a substituent selected, for example, from —CN, halogen, alkyl, and alkylsulfonyl, and C is the residue of a phenol, naphthol, indole, imidazothiazole, pyrazolone, thiazole, isothiazole or pyrazole type disperse dye coupling component. These dyes which are unexpectedly non-phototropic produce yellow to orange shades on hydrophobic fibers and exhibit improvements in one or more properties such as dyeability, dye exhaustion rate, light fastness, nonblooming, pH stability, build, fastness to ozone and nitrogen oxide, crock and wash fastness, migration, transfer, and pH stability on polyester, polyamide and other fibers including cellulose ester.

12 Claims, No Drawings

AZO DYES FROM UNSUBSTITUTED OR SUBSTITUTED 3-AMINO-PYRIDINE AND ARYL OR HETEROCYCLIC COUPLERS

DESCRIPTION

This invention concerns azo dyes having the general formula

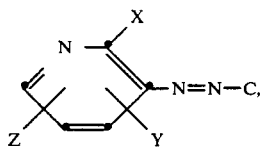

in which each of X, Y and Z are independently selected from H and a variety of substituents defined below, preferably provided that at least one of X and Y is a substituent selected, for example, from —CN, halogen, alkyl, and alkylsulfonyl, and C is the residue of a phenol, naphthol, indole, imidazothiazole, pyrazolone, thiazole, isothiazole or pyrazole type disperse dye coupling component. These dyes which are unexpectedly non-phototropic produce yellow to orange shades on hydrophobic fibers and exhibit improvements in one or more properties such as dyeability, dye exhaustion rate, light fastness, nonblooming, pH stability, build, fastness to ozone and nitrogen oxide, crock and wash fastness, migration, transfer, and pH stability on polyester, polyamide and other fibers including cellulose ester, over such dyes as are disclosed in British Patent No. 1,497,095.

The couplers C useful in the present invention have the formulae

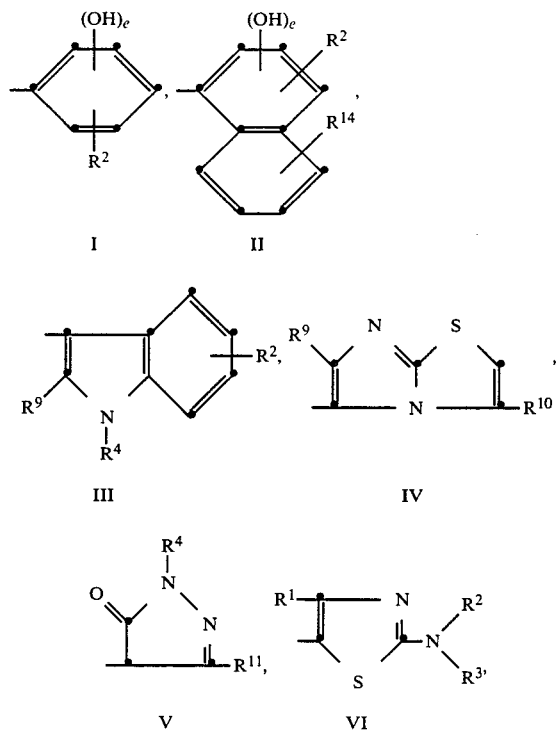

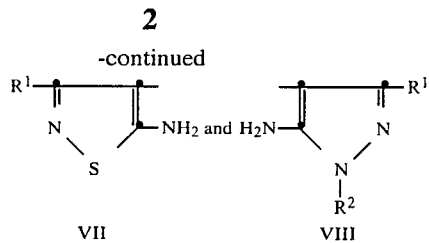

wherein: for couplers I through V as appropriate, $R^2$ and $R^{14}$ each represents hydrogen or up to three substituents selected from fluorine, chlorine, bromine, alkyl, cycloalkyl, alkoxy, phenoxy, alkylthio, arylthio, and radicals having the formula —NH—X—$R^3$ in which X is —CO—, —COO—, or —$SO_2$ and $R^3$ is selected from alkyl and alkyl substituted with halogen, hydroxy, phenoxy, aryl, cyano, cycloalkyl, alkylsulfonyl, alkylthio, alkanoyloxy, and alkoxy, and when X is —CO— in the formula —NH—X—$R^3$, $R^3$ also is selected from hydrogen, amino, alkylamino, dialkylamino, arylamino, aryl, and furyl;

$R^4$ is selected from hydrogen, alkyl, aryl, and cycloalkyl;

$R^9$, $R^{10}$ and $R^{11}$ are each selected from hydrogen, alkyl, phenyl, phenyl substituted with 1-3 substituents selected from Cl, Br, alkyl and alkoxy, alkylthio, benzylthio, cyclohexylthio, phenylthio and phenylthio substituted as for the phenyl;

e is 1 or 2;

each of the aliphatic portions or moieties of the above alkyl, cycloaliphatic, alkoxy, alkanoyl and like groups, as well as the aryl and aryloxy groups, may be substituted further with 1-3 of the following: hydroxy; halogen; cyano; succinimido; glutarimido; phthalimido; 2-pyrrolidono; cyclohexyl; phenyl; phenyl substituted with alkyl, alkoxy, halogen, alkanoylamino, cyano or alkoxycarbonyl; alkanoylamino; sulfamoyl; alkylsulfamoyl; vinylsulfonyl; acrylamido; phthalimidinyl; benzoylsulfonicimidyl; alkylsulfonamido; phenylsulfonamido; alkoxycarbonylamino; alkylcarbamoyloxy; alkoxycarbonyl; alkoxycarbonyloxy;

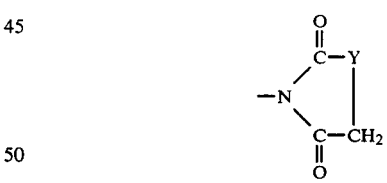

wherein Y is —NH—, —NH—alkyl—, —O—, —S—, or —$CH_2O$—; —S—$R^6$ wherein $R^6$ is alkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, or $$\underset{-C}{\overset{N-\!\!\!-\!\!\!-N-R^7;}{\underset{\diagdown N\diagup}{\|}}\overset{}{\underset{CH}{|}}}$$

—O$XR^3$; —NH—X—$R^3$; —X—$R^3$; —CON$R^7R^7$; —$SO_2NR^7R^7$; wherein $R^3$ and X are as defined above and each $R^7$ is selected from H and $R^3$; alkoxy; alkoxy substituted with 1-3 of hydroxy, cyano, alkanoyloxy, or alkoxy; phenoxy; phenoxy substituted with 1-3 of alkyl, alkoxy or halogen;

for Couplers VI, VII and VIII, $R^1$ and $R^2$ each is H, alkyl, cyclohexyl, alkyl substituted cyclohexyl, aryl or alkyl substituted with aryl;

$R^3$ is H, alkyl, lower alkyl substituted with 1-3 of halogen, hydroxy, aryl or lower alkanoyloxy, cyclohexyl, lower alkyl substituted cyclohexyl, or allyl; and $R^2$ and $R^3$ collectively are pentamethylene or ethyleneoxyethylene;

in which each aryl group is phenyl or phenyl substituted with 1-3 of alkyl, hydroxyalkyl, alkoxy, hydroxy, halogen, cyclohexoxy, cyclohexylmethyl, alkanoylamino, nitro or alkoxycarbonyl;

X, Y, and Z of the pyridine ring are independently selected from hydrogen, halogen, alkyl, alkoxy, aryl, cyano, carbamoyl, $CONHR_{12}$, $CONR_{12}R_{13}$, $SO_2R_{12}$, $COOR_{12}$, sulfamoyl, $SO_2NHR_{12}$, $SO_2NR_{12}R_{13}$, formyl, nitro, SCN, and $SR_{14}$, wherein $R_{12}$ is alkyl, cycloalkyl, or aryl, each of which cycloalkyl and aryl $R_{12}$ groups may be substituted with —CN, alkoxy, alkyl, hydroxy, alkanoyl or alkanoyloxy, $R_{13}$ is alkyl which may be substituted with cycloalkyl, or aryl, each of which substituents on $R_{13}$ may itself be substituted with —CN, alkoxy, alkyl, hydroxy, alkanoyl or alkanoyloxy, and $R_{14}$ is selected from $R_{12}$ and heterocyclic radicals, preferably

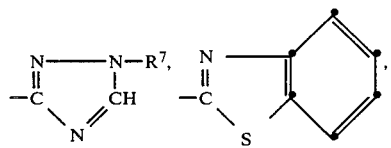

pyridyl, pyrimidinyl, and 1,3,4-thiadiazol-2-yl, wherein $R^7$ is as defined above, and preferably at least one of X and Y is cyano, $SO_2R_{12}$, $SR_{14}$, halogen, carbalkoxy, formyl, or nitro;

and wherein all of the aliphatic portions or moieties of all of the above groups within the definitions of X, Y, Z and the couplers, e.g the alkyl portions of alkoxy and alkylamino, contain from 1-8 carbons and are straight or branched.

Preferred dyes of the present invention have the formula

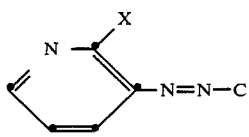

wherein X is chlorine, bromine, cyano, alkylthio, alkylsulfonyl, arylsulfonyl or —S heterocycle; C is selected from

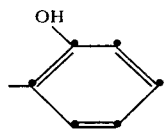

wherein the ring is substituted in the 4 position with alkyl, alkoxy or halogen;

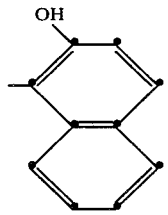

wherein the naphthalene ring is unsubstituted;

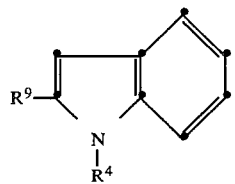

wherein $R^9$ is alkyl or aryl, $R^4$ is hydrogen, alkyl or cyanoethyl, and the benzene ring is unsubstituted;

wherein $R^9$ is phenyl, and $R^{10}$ is hydrogen or methyl;

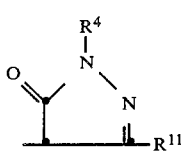

wherein $R^4$ is hydrogen or alkyl and $R^{11}$ is alkyl or phenyl;

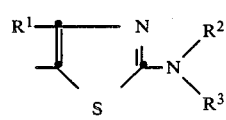

wherein $R^1$ is phenyl, $R^2$ is hydrogen or alkyl and $R^3$ is alkyl or aryl,

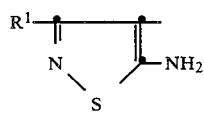

wherein $R^1$ is alkyl; and

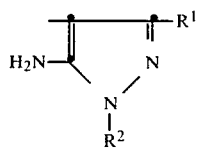

wherein R¹ is alkyl and R² is hydrogen or alkyl.

Most preferred dyes of the present invention have the formula

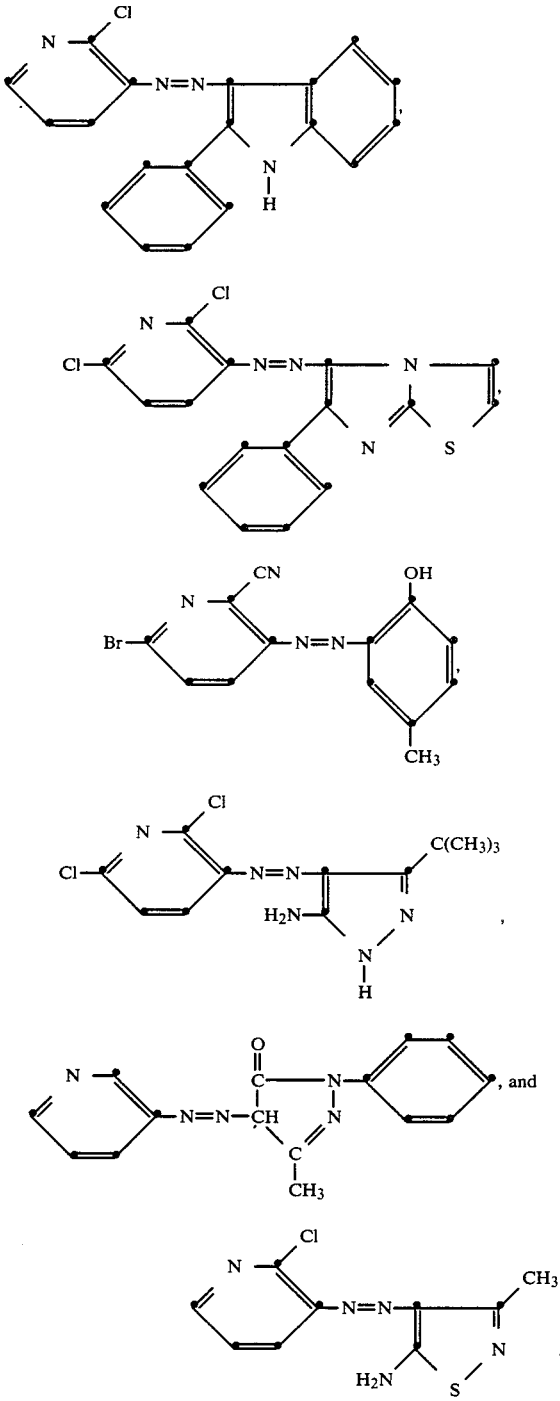

This invention will be further illustrated by the following examples although it will be understood that these examples are included merely for purposes of illustration and are not intended to limit the scope of the invention.

In general, the dyes are prepared by diazotizing 3-aminopyridines and then coupling, however, certain dyes are best prepared by nucleophilic substitution on the corresponding halopyridylazo dyes I as follows:

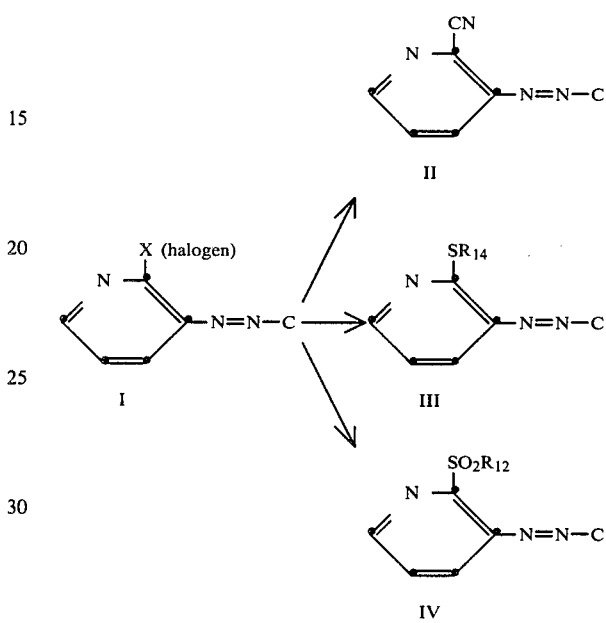

For example, Dyes I may be reacted with cuprous cyanide or sodium dicyanocuprate to produce the 2-cyano derivatives (II). Alkali metal mercaptides and sulfinates react with dyes I to give sulfides (III) and sulfones (IV), respectively. Displacements are also possible with nitrites, alkoxides, phenoxides, and sulfites to produce dyes containing nitro, alkoxy, phenoxy, and sulfo groups, respectively.

For each of the above reactions the temperature may vary within a wide range depending on the nature of the organic medium and, in particular, on the heat stability of the starting dyestuff. In general, the temperature should be maintained between about 25° and 150° C., with between 25° and 100° C. being preferred. Suitable solvents which may be readily selected by one skilled in the art include, for example, dimethylsulfoxide, formamide, dimethylformamide, dimethylacetamide, N-methyl-pyrrolidone, pyridine, quinoline, acetonitrile, benzonitrile and phosphoric acidtrisdimethylamide. Catalysts such as cupropus bromide and the like, also well known to the art, may be employed. The dye reactant may be the —Cl, —Br, —I or —F intermediate, and the displaced halogen in each of these reactions may be taken up by a cation, e.g., Na+, K+, or the like which may be present in a reactant, e.g., NaCu(CN)₂, or added thereto, such as K₂CO₃ or sodium acetate, in sufficient amount to maintain the desired neutral or basic reaction system. Typical sulfinic compounds are CH₃SO₂Na, PhSO₂Na and typical mercaptans are C₂H₅-SH and Ph-SH. These reactants, of course, have the respective general formulae $R_{12}SO_2M$ where, e.g., M is Na+, K+, or the like, and $HSR_{14}$ where $R_{12}$ and $R_{14}$ are defined above.

The practice of the invention is illustrated further by the following examples:

EXAMPLES 1–10

Diazotization and Coupling of 3-Aminopyridine

3-Aminopyridine (0.1 m) is dissolved in 100 ml. of water containing 30 ml. concentrated HCl. The solution is cooled and a solution of 7.1 g. of $NaNO_2$ in 20 ml. of water is added at 0°–5° C. After stirring for about 15 minutes, the diazonium salt is coupled with the following couplers:

Example 1-2-Phenylindole;
Example 2-N-Methyl-2-phenylindole;
Example 3-N-2-Carbamylethyl-2-phenylindole;
Example 4-6-Phenylimidazo[2,1-b]thiazole;
Example 5-2-(N,N-Diethylamino)-4-phenylthiazole;
Example 6-2-(N-Methyl-N-phenylamino)-4-phenylthiazole;
Example 7-5-Amino-3-methylisothiazole;
Example 8-5-Amino-3-t-butylpyrazole;
Example 9-5-Amino-3-methyl-N-phenylpyrazole; and
Example 10-5-Amino-3-methyl-N-2-hydroxyethylpyrazole.

The coupling is done as follows: Each of the above couplers (0.01 mole) is dissolved in 25–50 ml. of 1:5 acid (1 part propionic acid:5 parts acetic acid). To the chilled solution of each coupler is added a 0.01 mole aliquot of the above diazonium solution. The mineral acid is neutralized by the addition of solid ammonium acetate. Water is added to precipitate the dyes which are collected by filtration, washed with water and dried in air. If needed, the dyes are purified by reslurrying in hot methanol or ethanol.

EXAMPLES 11–20

Diazotization and Coupling of 3-Amino-2-chloropyridine

3-Amino-2-chloropyridine (12.8 g, 0.1 mole) is dissolved in 100 ml. $H_2O$ and 30 ml. of concentrated HCl. The solution is cooled and a solution of 7.1 g. of $NaNO_2$ in 20 ml. of $H_2O$ is added at 0°–5° C. After being stirred at 0°–5° C. for 15 minutes, the diazonium salt was coupled to the following couplers:

Example 11-p-Cresol;
Example 12-2-Naphthol;
Example 13-m-Acetamidophenol;
Example 14-N-n-Butyl-3-hydroxy-2-naphthoicacid amide;
Example 15-3-Methyl-N-phenyl-5-pyrazolone;
Example 16-3,5-Diphenyl-5-pyrazolone;
Example 17-3-Methyl-5-pyrazolone;

The above couplers (0.01 m. of each) are dissolved in 25 ml. of water containing 1.6 g. of sodium hydroxide at room temperature. Ice is added thereto and then a 0.01 m. aliquot of the above diazonium salt. The pH is adjusted to about seven by addition of acetic acid. The dyes are collected by filtration, washed with water, and dried in air.

Dyeing of fiber material, according to the invention, is appropriately carried out from an aqueous suspension in the presence of carriers at between 80° and 100° C., in the absence of carriers between 100°–130° C., or using the so-called thermofixing process at 180°–230° C. Printing of textile materials can be carried out by steaming the goods, printed with the present dyes in the presence of a carrier at temperatures between 80° and 110° C. or in the absence of a carrier at 110°–140° C., or also by treating the printed goods according to said thermofixing process.

A typical general procedure by which polyester, e.g., poly(ethylene terephthalate) can be dyed with the present dyes is as follows: The dye cake is dispersed by heating and agitating a dyepot containing the dye cake and methyl Cellosolve. When the dyecake has been ground free of lumps and dissolved as much as possible in the methyl Cellosolve, 2% based on weight of the fabric of Igepon T-51 and 2.0% based on weight of the fabric of sodium lignin sulfonate from a premixed solution of the two components is added. Sufficient demineralized water is added to make about a 30:1 bath ratio of water to dye and a small amount of Versene 100 (sodium salt of ethylenediaminetetracetic acid) and Tanalon JDM-72 (dye carrier) are added. The pH of the dyebath is adjusted to about 5.0 with acetic acid. The fabric samples (wet-out) are entered into the dyepot and the entire contents thereof entered into a pressure dyeing container. The container is sealed and entered into a High Temperature Launder-Ometer which is heated to 49° C. and rotation thereof started. The temperature of the Launder-Ometer is raised to 129° C. at the rate of about 2.8° C. per minute, and maintained at this temperature for 1 hour. The Launder-Ometer is then cooled, and the fabric samples removed and scoured in demineralized water containing 1 g./l. of neutral soapand 1 g./l. of sodium carbonate. The samples are rinsed in cold demineralized water and dried at 121° C. in a forced air oven.

The following tables show additional exemplary dyes of the present invention.

TABLE 1

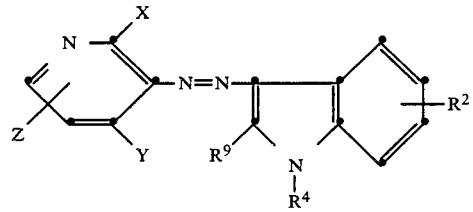

| X | Y | Z | $R^9$ | $R^2$ | $R^4$ |
|---|---|---|---|---|---|
| H | H | H | $C_6H_5$ | H | $CH_3$ |
| $CH_3$ | H | H | $CH_3$ | 6-$CH_3$ | $CH_3$ |
| CN | H | H | $CH_3$ | 6-$CH_3$ | $C_6H_5$ |
| $SCH_3$ | Cl | H | $CH_3$ | H | $C_2H_5$ |
| CN | H | H | $C_6H_5$ | H | H |
| CN | Br | H | $C_6H_5$ | H | $CH_3$ |

TABLE 1-continued

| X | Y | Z | R⁹ | R² | R⁴ |
|---|---|---|---|---|---|
| Cl | $NO_2$ | 4-Br | $CH_3$ | H | $CH_3$ |
| Br | CHO | 4-Br | $CH_3$ | 5-$OC_2H_5$ | $CH_3$ |
| $SO_2CH_3$ | CN | 5-$SO_2CH_3$ | $CH_3$ | 5-$OC_2H_5$ | H |
| $SO_2CH_3$ | H | 4-$SO_2CH_3$ | $C_6H_4$—p-Br | H | H |
| $SO_2CH_3$ | H | 4-$SO_2CH_3$ | $C_6H_5$ | H | $C_2H_4CONH_2$ |
| $SO_2C_6H_5$ | H | H | $C_6H_4$—p-$OCH_3$ | H | $C_2H_4CN$ |
| $SC_2H_4OH$ | I | H | $C_6H_4$—p-$OCH_3$ | 5-$C_6H_{11}$ | $C_2H_4SO_2NH_2$ |
| $SC_6H_5$ | H | 4-Cl | $C_2H_4CN$ | 6-$OC_6H_5$ | $C_2H_4N(COCH_3)_2$ |
| $SO_2C_6H_5$ | H | 4-$SO_2C_6H_5$ | $C_2H_4OCOCH_3$ | 6-$SCH_3$ | $C_2H_4SO_2NHC_2H_5$ |
| CN | $SCH_3$ | 4-CN | $CH_3$ | 6-$SC_6H_5$ | $C_2H_4SO_2NHC_2H_5$ |
| $CH_3$ | $NO_2$ | H | $CH_3$ | 6-$NHCOOCH_3$ | $C_2H_4OH$ |
| CN | H | H | $C_3H_7$ | 6-$NHSO_2CH_3$ | $C_2H_4CN$ |
| $OCH_3$ | $SO_2CH_3$ | H | $CH_3$ | 6-$OCH_3$ | $C_2H_4OCOCH_3$ |
| $SC_6H_4$—m-$CH_3$ | $SC_6H_5$ | H | $CH_3$ | 5-$NHCOCH_3$ | $C_2H_4OCOCH_3$ |
| CN | H | H | $C_2H_5$ | 6-$NHCOCH_2Cl$ | $C_6H_{13}$ |
| $C_6H_5$ | $SC_6H_{11}$ | H | $C_2H_5$ | 6-$NHCOC_2H_4OH$ | $C_2H_4OH$ |
| CN | H | H | $C_2H_5$ | 6-$NHCOC_2H_4OH$ | $CH_2C_6H_5$ |
| CN | H | 4-CN | $C_2H_5$ | 6-$NHCONHC_2H_5$ | $C_2H_4CN$ |
| $CONH_2$ | CN | 4-CN | $C_6H_4$—p-$OCH_3$ | 6-$NHCON(C_2H_5)_2$ | $C_2H_5$ |
| $CONHC_2H_5$ | CN | 4-CN | $C_2H_5$ | 6-$CH_3$ | $C_2H_4NHCOCH_3$ |
| $CON(C_2H_5)_2$ | CN | 4-CN | $C_2H_5$ | 6-$NHCOCH_3$ | $C_2H_4CONH_2$ |
| CN | H | 4-CN | $CH_3$ | H | $C_2H_4NHCOCH_3$ |
| CN | $SO_2CH_3$ | 4-CN | $CH_3$ | H | $C_2H_4Cl$ |
| $SO_2CH_3$ | H | 4-$SO_2CH_3$ | $C_6H_4$—p-$CH_3$ | 6-OH | $C_2H_4Cl$ |
| $SO_2N(CH_3)_2$ | $SO_2C_6H_5$ | 4-$SO_2C_6H_5$ | $C_6H_5$ | H | H |
| $SO_2C_4H_9$—n | H | 4-$SO_2C_4H_9$—n | $C_6H_5$ | H | H |
| $SC_2H_4OH$ | H | 4-$SC_2H_4OH$ | $C_6H_5$ | H | H |
| $NO_2$ | $CO_2CH_3$ | 5-$CO_2CH_3$ | $C_6H_5$3 | H | H |
| $SCH_3$ | $CO_2C_2H_5$ | 5-CN | $C_6H_5$ | H | H |
| CHO | $CO_2C_2H_5$ | 5-CN | $C_6H_5$ | H | H |
| $COOCH_3$ | H | 4-$OC_2H_5$ | $C_6H_5$ | H | $CH_3$ |
| H | CN | 5-CN | $CH_3$ | 6-$CH_3$ | $CH_3$ |
| $SO_2C_6H_5$ | H | 4-$SO_2C_6H_5$ | $CH_3$ | 6-$CH_3$ | $C_6H_5$ |
| $SO_2C_6H_5$ | H | 4-$CH_3$ | $CH_3$ | H | $C_2H_5$ |
| $SO_2C_6H_4$—p-Cl | H | 4-$SO_2C_6H_4$—p-Cl | $C_6H_5$ | H | H |
| $SO_2C_6H_4$—p-$CH_3$ | H | 4-$SO_2C_6H_4$—p-$CH_3$ | $C_6H_5$ | H | $CH_3$ |
| $SO_2C_6H_4$—m-$OCH_3$ | $SO_2C_6H_{11}$ | 4-$SO_2C_6H_4$—m-$OCH_3$ | $CH_3$ | H | $CH_3$ |
| $SO_2CH_2CH_2CN$ | H | 4-$SO_2CH_2CH_2CN$ | $CH_3$ | 5-$OC_2H_5$ | $CH_3$ |
| $SO_2CH_2C_6H_5$ | H | 4-$SO_2CH_2C_6H_5$ | $CH_3$ | 5-$OC_2H_5$ | H |
| $SC_2H_4OCCH_3$ (O=) | s-pyridyl | 4-$SC_2H_4OCCH_3$ (O=) | $C_6H_4$—p-Br | H | H |
| $SC_6H_{11}$ | H | 4-$SC_6H_{11}$ | $C_6H_5$ | H | $C_2H_4CONH_2$ |
|  | $NO_2$ | H | $C_6H_4$—p-$OCH_3$ | H | $C_2H_4CN$ |
| 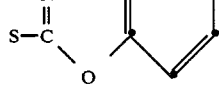 | s-pyrimidinyl | H | $C_6H_4$—p-$OCH_3$ | 5-$C_6H_{11}$ | $C_2H_4SO_2NH_2$ |
| 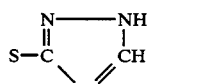 | CN | H | $C_2H_4CN$ | 6-$OC_6H_5$ | $C_2H_4N(COCH_3)_2$ |

TABLE 1-continued

| X | Y | Z | R⁹ | R² | R⁴ |
|---|---|---|----|----|----|
| (thiazolo-pyridyl) | CN | (4-S-pyridyl) | $C_2H_4OCOCH_3$ | 6-$SCH_3$ | $C_2H_4SO_2NHC_2H_5$ |
| (thiadiazolo-pyrimidinyl) | $COOCH_3$ | H | $CH_3$ | 6-$SC_6H_5$ | $C_2H_4SO_2NHC_2H_5$ |
| (N-methyl-thiotriazolyl) | CN | H | $CH_3$ | 6-$NHCOOCH_3$ | $C_2H_4OH$ |
| $-S-C(=N-N=C-NHCOCH_3)-S$ (thiadiazolyl) | CN | H | $C_3H_7$ | 6-$NHSO_2CH_3$ | $C_2H_4CN$ |
| $NO_2$ | H | H | $CH_3$ | 6-$OCH_3$ | $C_2H_4OCOCH_3$ |
| CN | H | 4-CN | $CH_3$ | 5-$NHCOCH_3$ | $C_2H_4OCOCH_3$ |
| $SO_2CH_2CH_3$ | H | 4-$SO_2CH_2CH_3$ | $C_2H_5$ | 6-$NHCOCH_2Cl$ | $C_6H_{13}$ |
| $SO_2NHCH_3$ | H | 4-$SO_2NHCH_3$ | $C_2H_5$ | 6-$NHCOC_2H_4OH$ | $C_2H_4OH$ |
| $SO_2CH_3$ | H | 4-$SO_2CH_3$ | $C_2H_5$ | 6-$NHCOC_2H_4OH$ | $CH_2C_6H_5$ |
| $SO_2C_6H_5$ | H | 4-$SO_2C_6H_5$ | $C_2H_5$ | 6-$NHCONHC_2H_5$ | $C_2H_4CN$ |
| CN | H | 4-Cl | $C_6H_4$—p-$OCH_3$ | 6-$NHCON(C_2H_5)_2$ | $C_2H_5$ |
| SCN | $NO_2$ | 4-Cl | $C_2H_5$ | 6-$CH_3$ | $C_2H_4NHCOCH_3$ |
| CN | H | 4-Br | $C_2H_5$ | 6-$NHCOCH_3$ | $C_2H_4CONH_2$ |
| s-pyridyl | CHO | 4-$OCH_3$ | $CH_3$ | H | $C_2H_4NHCOCH_3$ |
| CN | H | 4-CN | $CH_3$ | H | $C_2H_4Cl$ |
| s-pyrimidinyl | H | 4-CN | $C_6H_4$—p-$CH_3$ | 6-OH | $C_2H_4Cl$ |
| CN | $CH_3$ | 4-CN | $C_6H_5$ | H | H |
| CN | Cl | 4-CN | $C_6H_5$ | H | H |
| CN | H | 4-$CONH_2$ | $C_6H_5$ | H | H |
| CN | H | 4-$CON(C_2H_5)_2$ | $C_6H_5$ | H | H |
| CN | H | 4-$SO_2N(C_2H_5)_2$ | $C_6H_5$ | H | H |
| CN | H | 4-SCN | $C_6H_5$ | H | H |
| CN | H | 4-$SCH_3$ | $C_6H_5$ | H | $CH_3$ |
| $SC_6H_5$ | H | 4-CN | $CH_3$ | 6-$CH_3$ | $CH_3$ |
| $SC_4H_9$—n | H | 4-CN | $CH_3$ | 6-$CH_3$ | $C_6H_5$ |
| CN | $C_6H_5$ | 4-CN | $CH_3$ | H | $C_2H_5$ |
| CN | CN | 4-CN | $C_6H_5$ | H | H |
| $NO_2$ | H | H | $C_6H_5$ | H | $CH_3$ |

TABLE 2

| X | Y | Z | R⁹ | R¹⁰ |
|---|---|---|----|-----|
| H | H | H | $C_6H_5$ | H |
| $CH_3$ | H | H | $CH_3$ | H |
| CN | H | H | $CH_3$ | H |

TABLE 2-continued

| X | Y | Z | R⁹ | R¹⁰ |
|---|---|---|----|-----|
| SCH₃ | Cl | H | CH₃ | C₆H₅ |
| CN | H | H | CH₃ | C₆H₅ |
| CN | Br | H | C₆H₅ | CH₃ |
| Cl | NO₂ | 4-Br | C₆H₅ | CH₃ |
| Br | CHO | 4-Br | C₆H₅ | CH₃ |
| SO₂CH₃ | CN | 5-SO₂CH₃ | CH₃ | H |
| SO₂CH₃ | H | 4-SO₂CH₃ | CH₃ | H |
| SO₂CH₃ | H | 4-SO₂CH₃ | C₆H₄—p-Br | H |
| SO₂C₆H₅ | H | H | C₆H₄—p-OCH₃ | H |
| SC₂H₄OH | I | H | C₆H₄—p-OCH₃ | Br |
| SC₆H₅ | H | 4-Cl | C₆H₄CN | Br |
| SO₂C₆H₅ | H | 4-SO₂C₆H₅ | C₂H₄OCOCH₃ | Br |
| CN | SCH₃ | 4-CN | CH₃ | C₂H₅ |
| CH₃ | NO₂ | H | CH₃ | C₂H₅ |
| CN | H | H | C₃H₇ | C₆H₅ |
| OCH₃ | SO₂CH₃ | H | CH₃ | C₆H₅ |
| SC₆H₄—m-CH₃ | SC₆H₅ | H | C₂H₅ | C₆H₄—p-CH₃ |
| CN | H | H | C₂H₅ | H |
| C₆H₅ | SC₆H₁₁ | H | C₂H₅ | CONHC₂H₅ |
| CN | H | H | C₂H₅ | CH₃ |
| CN | H | 4-CN | C₆H₄—p-OCH₃ | C₂H₅ |
| CONH₂ | CN | 4-CN | C₂H₅ | SCN |
| CONHC₂H₅ | CN | 4-CN | C₂H₅ | CONH₂ |
| CON(C₂H₅)₂ | CN | 4-CN | CH₃ | CH(CH₃)₂ |
| CN | H | 4-CN | CH₃ | C₆H₅ |
| CN | SO₂CH₃ | 4-CN | C₆H₄—p-CH₃ | C₂H₅ |
| SO₂CH₃ | H | 4-SO₂CH₃ | C₆H₅ | H |
| SO₂N(CH₃)₂ | SO₂C₆H₅ | 4-SO₂CH₃ | C₆H₅ | H |
| SO₂C₄H₉—n | H | 4-SO₂C₄H₉—n | C₆H₅ | H |
| SC₂H₄OH | H | 4-SC₂H₄OH | C₆H₅ | H |
| NO₂ | CO₂CH₃ | 5-CO₂CH₃ | C₆H₅ | H |
| SCH₃ | CO₂C₂H₅ | 5-CN | C₆H₅ | H |
| CHO | CO₂C₂H₅ | 5-CN | C₆H₅ | H |
| COOCH₃ | H | 4-OC₂H₅ | CH₃ | H |
| H | CN | 5-CN | CH₃ | H |
| SO₂C₆H₅ | H | 4-SO₂C₆H₅ | CH₃ | C₆H₅ |
| SO₂C₆H₅ | H | 4-CH₃ | CH₃ | C₆H₅ |
| SO₂C₆H₄—p-Cl | H | 4-SO₂C₆H₄—p-Cl | C₆H₅ | CH₃ |
| SO₂C₆H₄—p-CH₃ | H | 4-SO₂C₆H₄—p-CH₃ | C₆H₅ | CH₃ |
| SO₂C₆H₄—m-OCH₃ | SO₂C₆H₁₁ | 4-SO₂C₆H₄—p-OCH₃ | C₆H₅ | CH₃ |
| SO₂CH₂CH₂CN | H | 4-SO₂CH₂CH₂CN | CH₃ | H |
| SO₂CH₂C₆H₅ | H | 4-SO₂CH₂C₆H₅ | CH₃ | H |
| SC₂H₄OCOCH₃ (with N=C–O ring) | s-pyridyl | 4-SC₂H₄OCOCH₃ | C₆H₄—p-Br | H |
| SC₆H₁₁ | H | 4-SC₆H₁₁ | C₆H₄—p-OCH₃ | H |
| (benzoxazole-type: S—C(=N)—O fused benzene) | NO₂ | H | C₆H₄—p-OCH₃ | Br |
| (triazole-type: S—C(=N)—NH—CH=N) | s-pyrimidinyl | H | C₆H₄CN | Br |
| (benzothiazole-type: S—C(=N)—S fused benzene) | CN | H | C₂H₄OCOCH₃ | Br |

TABLE 2-continued

| X | Y | Z | $R^9$ | $R^{10}$ |
|---|---|---|---|---|
| 2-thiazolopyridyl | CN | 4-S-pyridyl | $CH_3$ | $C_2H_5$ |
| thiazolopyrimidinyl | $COOCH_3$ | H | $CH_3$ | $C_2H_5$ |
| N-methyl thiadiazolyl (S-linked) | CN | H | $C_3H_7$ | $C_6H_5$ |
| -S-thiadiazolyl-C-NHCOCH$_3$ | CN | H | $CH_3$ | $C_6H_5$ |
| $NO_2$ | H | H | $C_2H_5$ | $C_6H_4$—p-$CH_3$ |
| CN | H | 4-CN | $C_2H_5$ | H |
| $SO_2CH_2CH_3$ | H | 4-$SO_2CH_2CH_3$ | $C_2H_5$ | $CONHC_2H_5$ |
| $SO_2NHCH_3$ | H | 4-$SO_2CH_3$ | $C_2H_5$ | $CH_3$ |
| $SO_2CH_3$ | H | 4-$SO_2CH_3$ | $C_6H_4$—p-$OCH_3$ | $C_2H_5$ |
| $SO_2C_6H_5$ | H | 4-$SO_2C_6H_5$ | $C_2H_5$ | SCN |
| CN | H | 4-Cl | $C_2H_5$ | $CONH_2$ |
| SCN | $NO_2$ | 4-Cl | $CH_3$ | $CH(CH_3)_2$ |
| CN | H | 4-Br | $CH_3$ | $C_6H_5$ |
| s-pyridyl | CHO | 4-$OCH_3$ | $C_6H_4$—p-$CH_3$ | $C_2H_5$ |
| CN | H | 4-CN | $C_2H_5$ | H |
| s-pyrimidinyl | H | 4-CN | $C_6H_5$ | H |
| CN | $CH_3$ | 4-CN | $C_6H_5$ | H |
| CN | Cl | 4-CN | $C_6H_5$ | H |
| CN | H | 4-$CONH_2$ | $C_6H_5$ | H |
| CN | H | 4-$CON(C_2H_5)_2$ | $C_6H_5$ | H |
| CN | H | 4-$SO_2N(C_2H_5)_2$ | $C_6H_5$ | H |
| CN | H | 4-SCN | $CH_3$ | H |
| CN | H | 4-$SCH_3$ | $CH_3$ | H |
| $SC_6H_5$ | H | 4-CN | $CH_3$ | $C_6H_5$ |
| $SC_4H_9$—n | H | 4-CN | $CH_3$ | $C_6H_5$ |
| CN | $C_6H_5$ | 4-CN | $C_6H_5$ | $CH_3$ |
| CN | CN | 4-CN | $C_6H_5$ | $CH_3$ |
| $NO_2$ | H | H | $C_6H_5$ | $CH_3$ |

TABLE 3

| X | Y | Z | $R^4$ | $R^{11}$ |
|---|---|---|---|---|
| H | H | H | H | $CH_3$ |
| $CH_3$ | H | H | H | $C_6H_4$—p-$OCH_3$ |

TABLE 3-continued

| X | Y | Z | R⁴ | R¹¹ |
|---|---|---|---|---|
| CN | H | H | H | $CF_3$ |
| $SCH_3$ | Cl | H | H | $COOC_2H_5$ |
| CN | H | H | H | $CONHC_4H_9-n$ |
| CN | Br | H | H | $C_6H_5$ |
| Cl | $NO_2$ | 4-Br | $C_6H_5$ | $C_6H_4-p-Br$ |
| Br | CHO | 4-Br | $C_6H_5$ | $C(CH_3)_3$ |
| $SO_2CH_3$ | CN | 5-$SO_2CH_3$ | $C_6H_5$ | $C_6H_{11}$ |
| $SO_2CH_3$ | H | 4-$SO_2CH_3$ | $C_6H_5$ | $C_6H_5$ |
| $SO_2CH_3$ | H | 4-$SO_2CH_3$ | $C_6H_5SO_2$ | $CH_3$ |
| $SO_2C_6H_5$ | H | H | $C_2H_5SO_2$ | $CH_3$ |
| $SC_2H_4OH$ | I | H | $CH_3CO$ | $CH_3$ |
| $SC_6H_5$ | H | 4-Cl | $C_6H_5CO$ | $CH_3$ |
| $SO_2C_6H_5$ | H | 4-$SO_2C_6H_5$ | $CH_3$ | $CONH_2$ |
| CN | $SCH_3$ | 4-CH | $C_2H_4OH$ | $C_2H_5$ |
| $CH_3$ | $NO_2$ | H | $C_2H_4CN$ | $C_2H_5$ |
| CN | H | H | $C_2H_4OCOCH_3$ | $C_2H_5$ |
| $OCH_3$ | $SO_2CH_3$ | H | $C_6H_{11}$ | $CF_3$ |
| $SC_6H_4-m-CH_3$ | $SC_6H_5$ | H | $C_2H_4OH$ | $C_6H_4-p-Cl$ |
| CN | H | H | $CH_2C_6H_5$ | $CONHC_2H_5$ |
| $C_6H_5$ | $SC_6H_{11}$ | H | $C_2H_4CN$ | $CH(CH_3)_2$ |
| CN | H | H | $C_2H_5$ | $CH(CH_3)_2$ |
| CN | H | 4-CN | $C_2H_4NHCOCH_3$ | $C_2H_5$ |
| $CONH_2$ | CN | 4-CN | $C_2H_4CONH_2$ | $CH_3$ |
| $CONHC_2H_5$ | CN | 4-CN | $C_2H_4NHCOCH_3$ | $C_2H_5$ |
| $CON(C_2H_5)_2$ | CN | 4-CN | $C_2H_4NHCOCH_3$ | $C_6H_5$ |
| CN | H | 4-CN | $C_6H_5$ | $CH_3$ |
| CN | $SO_2CH_3$ | 4-CN | $C_6H_5$ | $CH_3$ |
| $SO_2CH_3$ | H | 4-$SO_2CH_3$ | $C_6H_5$ | $CH_3$ |
| $SO_2N(CH_3)_2$ | $SO_2C_6H_5$ | 4-$SO_2CH_3$ | $C_6H_5$ | $CH_3$ |
| $SO_2C_4H_9-n$ | H | 4-$SO_2C_4H_9-n$ | $C_6H_5$ | $CH_3$ |
| $SC_2H_4OH$ | H | 4-$SC_2H_4OH$ | $C_6H_5$ | $CH_3$ |
| $NO_2$ | $CO_2CH_3$ | 5-$CO_2CH_3$ | H | $CH_3$ |
| $SCH_3$ | $CO_2C_2H_5$ | 5-CN | H | $C_6H_4-p-OCH_3$ |
| CHO | $CO_2C_2H_5$ | 5-CN | H | $CF_3$ |
| $COOCH_3$ | H | 4-$OC_2H_5$ | H | $COOC_2H_5$ |
| H | CN | 5-CN | H | $CONHC_4H_9-n$ |
| $SO_2C_6H_5$ | H | 4-$SO_2C_6H_5$ | H | $C_6H_5$ |
| $SO_2C_6H_5$ | H | 4-$CH_3$ | $C_6H_5$ | $C_6H_4-p-Br$ |
| $SO_2C_6H_4-p-Cl$ | H | 4-$SO_2C_6H_4-p-Cl$ | $C_6H_5$ | $C(CH_3)_3$ |
| $SO_2C_6H_4-p-CH_3$ | H | 4-$SO_2C_6H_4-p-CH_3$ | $C_6H_5$ | $C_6H_{11}$ |
| $SO_2C_6H_4-m-OCH_3$ | $SO_2C_6H_{11}$ | 4-$SO_2C_6H_4-p-OCH_3$ | $C_6H_5$ | $C_6H_5$ |
| $SO_2CH_2CH_2CN$ | H | 4-$SO_2CH_2CH_2CN$ | $C_6H_5SO_2$ | $CH_3$ |
| $SO_2CH_2C_6H_5$ | H | 4-$SO_2CH_2C_6H_5$ | $C_2H_5SO_2$ | $CH_3$ |
| $SC_2H_4OCCH_3$ (O=) | s-pyridyl | 4-$SC_2H_4OCCH_3$ (O=) | $CH_3CO$ | $CH_3$ |
| $SC_6H_{11}$ | H | 4-$SC_6H_{11}$ | $C_6H_5CO$ | $CH_3$ |
| 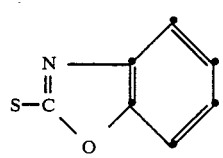 | $NO_2$ | H | $CH_3$ | $CONH_2$ |
| 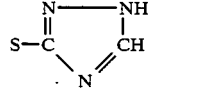 | s-pyrimidinyl | H | $C_2H_4OH$ | $C_2H_5$ |

TABLE 3-continued

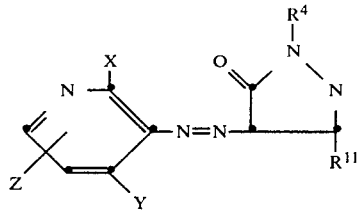

| X | Y | Z | R⁴ | R¹¹ |
|---|---|---|---|---|
| 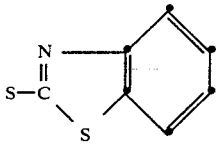 | CN | H | $C_2H_4CN$ | $C_2H_5$ |
| 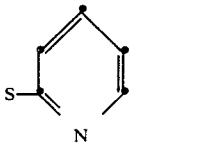 | CN | 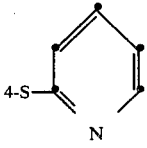 | $C_2H_4OCOCH_3$ | $C_2H_5$ |
| 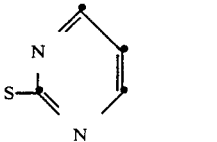 | $COOCH_3$ | H | $C_6H_{11}$ | $CF_3$ |
| 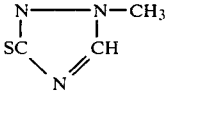 | CN | H | $C_2H_4OH$ | $C_6H_4$—p-Cl |
| 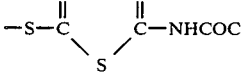 | CN | H | $CH_2C_6H_5$ | $CONHC_2H_5$ |
| $NO_2$ | H | H | $C_2H_4CN$ | $CH(CH_3)_2$ |
| CN | H | 4-CN | $C_2H_5$ | $CH(CH_3)_2$ |
| $SO_2CH_2CH_3$ | H | $4-SO_2CH_2CH_3$ | $C_2H_4NHCOCH_3$ | $C_2H_5$ |
| $SO_2NHCH_3$ | H | $4-SO_2CH_3$ | $C_2H_4CONH_2$ | $CH_3$ |
| $SO_2CH_3$ | H | $4-SO_2CH_3$ | $C_2H_4NHCOCH_3$ | $C_2H_5$ |
| $SO_2C_6H_5$ | H | $4-SO_2C_6H_5$ | $C_2H_4NHCOCH_3$ | $C_6H_5$ |
| CN | H | 4-Cl | $C_6H_5$ | $CH_3$ |
| SCN | $NO_2$ | 4-Cl | $C_6H_5$ | $CH_3$ |
| CN | H | 4-Br | $C_6H_5$ | $CH_3$ |
| s-pyridyl | CHO | $4-OCH_3$ | $C_6H_5$ | $CH_3$ |
| CN | H | 4-CN | $C_6H_5$ | $CH_3$ |
| s-pyrimidinyl | H | 4-CN | $C_6H_5$ | $CH_3$ |
| CN | $CH_3$ | 4-CN | H | $CH_3$ |
| CN | Cl | 4-CN | H | $C_6H_4$—p-$OCH_3$ |
| CN | H | $4-CONH_2$ | H | $CF_3$ |
| CN | H | $4-CON(C_2H_5)_2$ | H | $COOC_2H_5$ |
| CN | H | $4-SO_2N(C_2H_5)_2$ | H | $CONHC_4H_9$—n |
| CN | H | 4-SCN | H | $C_6H_5$ |
| CN | H | $4-SCH_3$ | $C_6H_5$ | $C_6H_4$—p-Br |
| $SC_6H_5$ | H | 4-CN | $C_6H_5$ | $C(CH_3)_3$ |
| $SC_4H_9$—n | H | 4-CN | $C_6H_5$ | $C_6H_{11}$ |
| CN | $C_6H_5$ | 4-CN | $C_6H_5$ | $C_6H_5$ |
| CN | CN | 4-CN | $C_6H_5SO_2$ | $CH_3$ |
| $NO_2$ | H | H | $C_2H_5SO_2$ | $CH_3$ |

TABLE 4

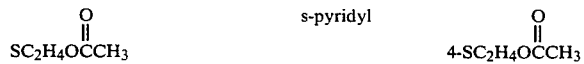

| X | Y | Z | OH Position | R² |
|---|---|---|---|---|
| H | H | H | 2 | 5-CH₃ |
| CN | H | H | 2 | 5-CH₃ |
| CN | H | H | 2 | 5-OCH₃ |
| SCH₃ | Cl | H | 2 | 5-Cl |
| CN | H | H | 2 | 5-Cl |
| CN | Br | H | 4 | 3-OCH₃ |
| Cl | NO₂ | 4-Br | 4 | 3-OCH₃ |
| Br | CHO | 4-Br | 3,4 | H |
| SO₂CH₃ | CN | 5-SO₂CH₃ | 4 | 2-NH—C₆H₅ |
| SO₂CH₃ | H | 4-SO₂CH₃ | 2 | 5-NHCOCH₃ |
| SO₂CH₃ | H | 4-SO₂CH₃ | 3,4 | H |
| SO₂C₆H₅ | H | H | 2 | 5-CONHC₄H₉—n |
| SC₂H₄OH | I | H | 2 | 5-C₆H₁₁ |
| SC₆H₅ | H | 4-Cl | 2 | 5-OC₆H₅ |
| SO₂C₆H₅ | H | 4-SO₂C₆H₅ | 2 | 5-SCH₃ |
| CN | SCH₃ | 4-CN | 2 | 5-SC₆H₅ |
| CH₃ | NO₂ | H | 2 | 5-NHCOOCH₃ |
| CN | H | H | 2 | 5-NHSO₂CH₃ |
| OCH₃ | SO₂CH₃ | H | 2 | 5-NHCOCH₃ |
| SC₆H₄—m-CH₃ | SC₆H₅ | H | 2 | 5-NHCOCH₂Cl |
| CN | H | H | 2 | 5-NHCOC₂H₄OH |
| C₆H₅ | SC₆H₁₁ | H | 2 | 5-Cl |
| CN | H | H | 2 | 5-NHCONHC₂H₅ |
| CN | H | 4-CN | 2 | 5-NHCON(C₂H₅)₂ |
| CONH₂ | CN | 4-CN | 2 | 5-CH₃ |
| CONHC₂H₅ | CN | 4-CN | 2 | 5-NHCOCH₃ |
| CON(C₂H₅)₂ | CN | 4-CN | 4 | H |
| CN | H | 4-CN | 2 | 5-CH₃ |
| CN | SO₂CH₃ | 4-CN | 2 | 5-CH₃ |
| SO₂CH₃ | H | 4-SO₂CH₃ | 2 | 5-OCH₃ |
| SO₂N(CH₃)₂ | SO₂C₆H₅ | 4-SO₂CH₃ | 2 | 5-Cl |
| SO₂C₄H₉—n | H | 4-SO₂C₄H₉—n | 2 | 5-Cl |
| SC₂H₄OH | H | 4-SC₂H₄OH | 4 | 3-OCH₃ |
| NO₂ | CO₂CH₃ | 5-CO₂CH₃ | 4 | 3-OCH₃ |
| SCH₃ | CO₂C₂H₅ | 5-CN | 3,4 | H |
| CHO | CO₂C₂H₅ | 5-CN | 4 | 2-NH—C₆H₅ |
| COOCH₃ | H | 4-OC₂H₅ | 2 | 5-NHCOCH₃ |
| H | CN | 5-CN | 3,4 | H |
| SO₂C₆H₅ | H | 4-SO₂C₆H₅ | 2 | 5-CONHC₄H₉—n |
| SO₂C₆H₅ | H | 4-CH₃ | 2 | 5-C₆H₁₁ |
| SO₂C₆H₄—p-Cl | H | 4-SO₂C₆H₄—p-Cl | 2 | 5-OC₆H₅ |
| SO₂C₆H₄—p-CH₃ | H | 4-SO₂C₆H₄—p-CH₃ | 2 | 5-SCH₃ |
| SO₂C₆H₄—m-OCH₃ | SO₂C₆H₁₁ | 4-SO₂C₆H₄—p-OCH₃ | 2 | 5-SC₆H₅ |
| SO₂CH₂CH₂CN | H | 4-SO₂CH₂CH₂CN | 2 | 5-NHCOOCH₃ |
| SO₂CH₂C₆H₅ | H | 4-SO₂CH₂C₆H₅ | 2 | 5-NHSO₂CH₃ |
| SC₂H₄OCCH₃ (O) | s-pyridyl | 4-SC₂H₄OCCH₃ (O) | 2 | 5-NHCOCH₃ |
| SC₆H₁₁ | H | 4-SC₆H₁₁ | 2 | 5-NHCOCH₂Cl |
| 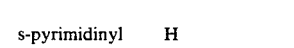 | NO₂ | H | 2 | 5-NHCOC₂H₄OH |
|  | s-pyrimidinyl | H | 2 | 5-Cl |

TABLE 4-continued

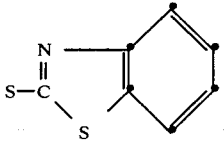

| X | Y | Z | OH Position | R² |
|---|---|---|---|---|
| 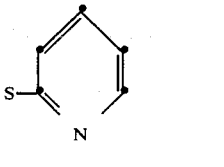 | CN | H | 2 | 5-NHCONHC₂H₅ |
| 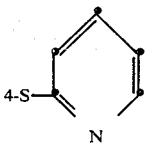 | CN | 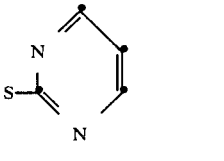 4-S- | 2 | 5-NHCON(C₂H₅)₂ |
| 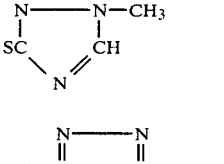 | COOCH₃ | H | 2 | 5-CH₃ |
| 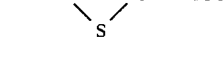 | CN | H | 2 | 5-NHCOCH₃ |
| N=N, -S-C  C-NHCOCH₃, S | CN | H | 4 | H |
| NO₂ | H | H | 2 | 5-CH₃ |
| CN | H | 4-CN | 2 | 5-CH₃ |
| SO₂CH₂CH₃ | H | 4-SO₂CH₂CH₃ | 2 | 5-OCH₃ |
| SO₂NHCH₃ | H | 4-SO₂CH₃ | 2 | 5-Cl |
| SO₂CH₃ | H | 4-SO₂CH₃ | 2 | 5-Cl |
| SO₂C₆H₅ | H | 4-SO₂C₆H₅ | 4 | 3-OCH₃ |
| CN | H | 4-Cl | 4 | 3-OCH₃ |
| SCN | NO₂ | 4-Cl | 3,4 | H |
| CN | H | 4-Br | 4 | 2-NH—C₆H₅ |
| s-pyridyl | CHO | 4-OCH₃ | 2 | 5-NHCOCH₃ |
| CN | H | 4-CN | 3,4 | H |
| s-pyrimidinyl | H | 4-CN | 2 | 5-CONHC₄H₉—n |
| CN | CH₃ | 4-CN | 2 | 5-C₆H₁₁ |
| CN | Cl | 4-CN | 2 | 5-OC₆H₅ |
| CN | H | 4-CONH₂ | 2 | 5-SCH₃ |
| CN | H | 4-CON(C₂H₅)₂ | 2 | 5-SC₆H₅ |
| CN | H | 4-SO₂N(C₂H₅)₂ | 2 | 5-NHCOOCH₃ |
| CN | H | 4-SCN | 2 | 5-NHSO₂CH₃ |
| CN | H | 4-SCH₃ | 2 | 5-NHCOCH₃ |
| SC₆H₅ | H | 4-CN | 2 | 5-NHCOCH₂Cl |
| SC₄H₉—n | H | 4-CN | 2 | 5-NHCOC₂H₄OH |
| CN | C₆H₅ | 4-CN | 2 | 5-Cl |
| CN | CN | 4-CN | 2 | 5-NHCONHC₂H₅ |
| NO₂ | H | H | 2 | 5-NHCON(C₂H₅)₂ |

TABLE 5

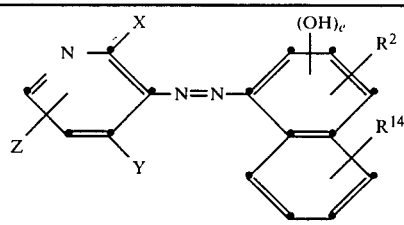

| X | Y | Z | OH Position | R² | R¹⁴ |
|---|---|---|---|---|---|
| H | H | H | 2 | H | 6-SO₂N(CH₃)₂ |
| CH₃ | H | H | 2 | H | 6-SO₂N(CH₃)₂ |
| CN | H | H | 2 | 3-CONH₂ | H |
| SCH₃ | Cl | H | 4 | H | H |
| CN | H | H | 4 | H | H |
| CN | Br | H | 2,6 | H | H |
| Cl | NO₂ | 4-Br | 2 | H | H |
| Br | CHO | 4-Br | 2 | H | 6-SO₂NHCH₃ |
| SO₂CH₃ | CN | 5-SO₂CH₃ | 2 | 3-CONH₂ | H |
| SO₂CH₃ | H | 4-SO₂CH₃ | 2 | 3-CONHC₆H₅ | H |
| SO₂CH₃ | H | 4-SO₂CH₃ | 2 | 3-CONH—C₆H₄—p-OC₂H₄OH | H |
| SO₂C₆H₅ | H | H | 4 | H | H |
| SC₂H₄OH | I | H | 4 | H | H |
| SC₆H₅ | H | 4-Cl | 4 | H | H |
| SO₂C₆H₅ | H | 4-SO₂C₆H₅ | 2 | H | H |
| CN | SCH₃ | 4-CN | 2 | H | H |
| CH₃ | NO₂ | H | 2 | 3-CO₂CH₃ | H |
| CN | H | H | 2 | 3-CO₂CH₃ | H |
| OCH₃ | SO₂CH₃ | H | 2,4 | H | H |
| SC₆H₄—m-CH₃ | SC₆H₅ | H | 2 | 3-COCH₂Cl | H |
| CN | H | H | 4 | H | H |
| C₆H₅ | SC₆H₁₁ | H | 4 | H | H |
| CN | H | H | 4 | H | H |
| CN | H | 4-CN | 4 | H | H |
| CONH₂ | CN | 4-CN | 4 | H | H |
| CONHC₂H₅ | CN | 4-CN | 2 | 3-CONHC₆H₅ | H |
| CON(C₂H₅)₂ | CN | 4-CN | 2 | H | H |
| CN | H | 4-CN | 2 | 3-CONHC₄H₉—n | H |
| CN | SO₂CH₃ | 4-CN | 2 | 3-CONHC₄H₉—n | H |
| SO₂CH₃ | H | 4-SO₂CH₃ | 2 | H | 6-SO₂N(CH₃)₂ |
| SO₂N(CH₃)₂ | SO₂C₆H₅ | 4-SO₂CH₃ | 2 | H | 6-SO₂N(CH₃)₂ |
| SO₂C₄H₉—n | H | 4-SO₂C₄H₉—n | 2 | 3-CONH₂ | H |
| SC₂H₄OH | H | 4-SC₂H₄OH | 4 | H | H |
| NO₂ | CO₂CH₃ | 5-CO₂CH₃ | 4 | H | H |
| SCH₃ | CO₂C₂H₅ | 5-CN | 2,6 | H | H |
| CHO | CO₂C₂H₅ | 5-CN | 2 | H | H |
| COOCH₃ | H | 4-OC₂H₅ | 2 | H | 6-SO₂NHCH₃ |
| H | CN | 5-CN | 2 | 3-CONH₂ | H |
| SO₂C₆H₅ | H | 4-SO₂C₆H₅ | 2 | 3-CONHC₆H₅ | H |
| SO₂C₆H₅ | H | 4-CH₃ | 2 | 3-CONH—C₆H₄—p-OC₂H₄OH | H |
| SO₂C₆H₄—p-Cl | H | 4-SO₂C₆H₄—p-Cl | 4 | H | H |
| SO₂C₆H₄—p-CH₃ | H | 4-SO₂C₆H₄—p-CH₃ | 4 | H | H |
| SO₂C₆H₄—m-OCH₃ | SO₂C₆H₁₁ | 4-SO₂C₆H₄—p-OCH₃ | 4 | H | H |
| SO₂CH₂CH₂CN | H | 4-SO₂CH₂CH₂CN | 2 | H | H |
| SO₂CH₂C₆H₅ | H | 4-SO₂CH₂C₆H₅ | 2 | H | H |
| SC₂H₄OCCH₃ (O=) | s-pyridyl | 4-SC₂H₄OCCH₃ (O=) | 2 | 3-CO₂CH₃ | H |
| SC₆H₁₁ | H | 4-SC₆H₁₁ | 2 | 3-CO₂CH₃ | H |
| (benzoxazolyl-2-thio) | NO₂ | H | 2,4 | H | H |
| (thiadiazolyl-2-thio) | s-pyrimidinyl | H | 2 | 3-COCH₂Cl | H |

TABLE 5-continued

[Structure: pyridyl-azo-naphthol/phenol system with X, Y on pyridine ring, Z substituent, (OH)c, R², R¹⁴ on aromatic system]

| X | Y | Z | OH Position | R² | R¹⁴ |
|---|---|---|---|---|---|
| [benzothiazol-2-yl-thio] | CN | H | 4 | H | H |
| [pyridin-2-yl-thio] | CN | 4-S-[pyridin-2-yl] | 4 | H | H |
| [pyrimidin-2-yl-thio] | COOCH₃ | H | 4 | H | H |
| [1-methyl-1,2,4-triazol-3-yl-thio] | CN | H | 4 | H | H |
| —S—[5-(NHCOCH₃)-1,3,4-thiadiazol-2-yl] | CN | H | 4 | H | H |
| NO₂ | H | H | 2 | 3-CONHC₆H₅ | H |
| CN | H | 4-CN | 2 | H | H |
| SO₂CH₂CH₃ | H | 4-SO₂CH₂CH₃ | 2 | 3-CONHC₄H₉—n | H |
| SO₂NHCH₃ | H | 4-SO₂CH₃ | 2 | 3-CONHC₄H₉—n | H |
| SO₂CH₃ | H | 4-SO₂CH₃ | 2 | H | 6-SO₂N(CH₃)₂ |
| SO₂C₆H₅ | H | 4-SO₂C₆H₅ | 2 | H | 6-SO₂N(CH₃)₂ |
| CN | H | 4-Cl | 2 | 3-CONH₂ | H |
| SCN | NO₂ | 4-Cl | 4 | H | H |
| CN | H | 4-Br | 4 | H | H |
| s-pyridyl | CHO | 4-OCH₃ | 2,6 | H | H |
| CN | H | 4-CN | 2 | H | H |
| s-pyrimidinyl | H | 4-CN | 2 | H | 6-SO₂NHCH₃ |
| CN | CH₃ | 4-CN | 2 | 3-CONH₂ | H |
| CN | Cl | 4-CN | 2 | 3-CONHC₆H₅ | H |
| CN | H | 4-CONH₂ | 2 | 3-CONH—C₆H₄—p-OC₂H₄OH | H |
| CN | H | 4-CON(C₂H₅)₂ | 4 | H | H |
| CN | H | 4-SO₂N(C₂H₅)₂ | 4 | H | H |
| CN | H | 4-SCN | 4 | H | H |
| CN | H | 4-SCH₃ | 2 | H | H |
| SC₆H₅ | H | 4-CN | 2 | H | H |
| SC₄H₉—n | H | 4-CN | 2 | 3-CO₂CH₃ | H |
| CN | C₆H₅ | 4-CN | 2 | 3-CO₂CH₃ | H |
| CN | CN | 4-CN | 2,4 | H | H |
| NO₂ | H | H | 2 | 3-COCH₂Cl | H |

TABLE 6

| X | Y | Z | R¹ | R² | R³ |
|---|---|---|---|---|---|
| H | H | H | $C_6H_5$ | $CH_3$ | $CH_3$ |
| $CH_3$ | H | H | $C_6H_4$—p-$OCH_3$ | $CH_3$ | $CH_3$ |
| CN | H | H | $C_6H_5$ | $C_6H_5$ | $C_2H_5$ |
| $SCH_3$ | Cl | H | $C_6H_4$—p-$OCH_3$ | $C_6H_5$ | $CH_3$ |
| CN | H | H | $C_6H_5$ | $C_6H_5$ | $CH_3$ |
| CN | Br | H | $C_6H_5$ | $C_6H_5$ | H |
| Cl | $NO_2$ | H | $C_6H_5$ | $C_6H_4$—p-$OCH_3$ | H |
| Br | CHO | 4-Br | $C_6H_5$ | $CH_2CH_2CH_3$ | $CH_2CH_2CH_3$ |
| $SO_2CH_3$ | CN | 4-Br | $C_6H_5$ | $CH_2CH_2CH_3$ | H |
| $SO_2CH_3$ | H | 5-$SO_2CH_3$ | $C_6H_5$ | $CH(CH_3)C_2H_5$ | H |
| $SO_2CH_3$ | H | 4-$SO_2CH_3$ | $C_6H_5$ | $C_6H_{11}$ | H |
| $SO_2C_6H_5$ | H | 4-$SO_2C_6H_5$ | $C_6H_4$—p-$CH_3$ | $C_6H_{11}$ | $C_2H_5$ |
| $SC_2H_5$ | I | H | $C_6H_5$ | $CH_3$ | $CH_3$ |
| $SC_6H_5$ | H | H | $C_6H_4$—p-NHCOCH_3$ | $C_6H_4$—p-NHCOCH$_3$ | H |
| $SO_2C_6H_5$ | $CH_3$ | 4-Cl | $C_6H_4$—m-Cl | $C_6H_4$—p-$CH_3$ | $C_2H_5$ |
| CN | $NO_2$ | H | $C_6H_4$—o-Cl | $C_6H_4$—m-$CH_3$ | $CH_3$ |
| $CH_3$ | H | 4-$SO_2C_6H_5$ | $C_6H_4$—p-Br | $C_6H_4$—m-$CH_3$ | $CH_3$ |
| $OCH_3$ | $SO_2CH_3$ | 4-CN | $C_6H_4$—p-$NO_2$ | $CH_3$ | $C_2H_5$ |
| $SC_6H_4$—m-$CH_3$ | $SC_6H_5$ | H | $C_6H_{11}$ | $C_6H_5$ | $CH_3$ |
| CN | H | H | $CH_2C_6H_5$ | $C_6H_5$ | $CH_3$ |
| $C_6H_5$ | $SC_6H_{11}$ | H | $CH_3$ | $C_6H_5$ | $CH_2CH=CH_2$ |
| CN | H | H | $C_2H_5$ | $C_6H_5$ | $CH_2CH_2OH$ |
| CN | H | 4-CN | $C_6H_5$ | $CH_2CH_2$—O—$CH_2CH_2$ | |
| | | | | $CH_2CH_2CH_2CH_2CH_2$ | |
| $CONH_2$ | CN | 4-CN | $C_6H_4$—p-$OCH_3$ | $CH_2C_6H_5$ | $C_2H_5$ |
| $CONHC_2H_5$ | CN | 4-CN | $C_6H_4$—p-$OCH_3$ | $C_6H_5$ | $CH_3$ |
| $CON(C_2H_5)_2$ | CN | 4-CN | $C_6H_4$—p-$OCH_3$ | $C_6H_5$ | $CH_2CH_2CH_3$ |
| CN | H | 4-CN | $C_6H_4$—p-$OCH_3$ | $C_6H_5$ | $CH_2CH_2OOCCH_3$ |
| CN | $SO_2CH_3$ | H | $C_6H_4$—p-$OCH_3$ | $C_4H_9$—n | $C_4H_9$—n |
| $SO_2CH_3$ | H | 4-$SO_2CH_3$ | $C_6H_4$—p-$OCH_3$ | $C_6H_{11}$ | H |
| $SO_2N(CH_3)_2$ | $SO_2C_6H_5$ | 4-$SO_2CH_3$ | $C_6H_4$—p-$OC_6H_5$ | $CH(CH_3)_2$ | H |
| $SO_2C_4H_9$—n | H | 4-$SO_2C_4H_9$—n | $C_6H_4$—p-$OCH_2CH(CH_3)_2$ | $C_6H_5$ | $C_2H_5$ |
| CN | $SO_2CH_3$ | 4-$SC_6H_4OH$ | $C_6H_4$—p-$OCH_2C_6H_{11}$ | $C_6H_5$ | $CH_3$ |
| $SC_2H_4OH$ | $CO_2CH_3$ | 5-$CO_2CH_3$ | $C_6H_4$—p-OH | $CH_3$ | $CH_3$ |
| $NO_2$ | $CO_2C_2H_5$ | 5-CN | $C_6H_4$—p-OH | $CH_3$ | $CH_3$ |
| $SCH_3$ | $CO_2C_2H_5$ | 5-CN | $C_6H_4$—p-$CH_2C_6H_{11}$ | $CH_3$ | $CH_3$ |
| CHO | H | 5-CN | $C_6H_4$—p-$CH_3$ | $C_6H_5$ | $CH_3$ |
| $COOCH_3$ | H | H | $C_6H_5$ | $C_6H_5$ | H |
| H | CN | 5-CN | $C_6H_5$ | $C_6H_5$—o,p-di-$CH_3$ | H |
| $SO_2C_6H_5$ | H | 4-$SO_2C_6H_4$—p-Cl | $C_6H_5$ | $C_6H_4$—o-Cl | H |
| $SO_2C_6H_5$ | H | 4-$CH_3$ | $C_6H_5$ | $C_6H_3$—o,m-di-Cl | H |
| $SO_2C_6H_4$—p-Cl | H | 4-$SO_2C_6H_4$—p-Cl | $C_6H_5$ | $C_6H_4$—p-Cl | H |
| $SO_2C_6H_4$—p-$CH_3$ | H | 4-$SO_2C_6H_4$—p-$CH_3$ | $C_6H_5$ | $C_6H_4$—m-$CH_3$ | H |
| $SO_2C_6H_4$—m-$OCH_3$ | $SO_2C_6H_{11}$ | 4-$SO_2C_6H_4$—p-$OCH_3$ | $C_6H_5$ | $C_6H_4$—o-$OCH_3$ | H |

TABLE 6-continued

| X | Y | Z | R¹ | R² | R³ |
|---|---|---|----|----|----|
| $SO_2CH_2CH_2CN$ | H | $4-SO_2CH_2CH_2CN$ | $C_6H_4-p-OCH_3$ | $C_6H_4-o-CH_3$ | H |
| $SO_2CH_2C_6H_5$ | H | $4-SO_2CH_2C_6H_5$ | $C_6H_4-p-OCH_3$ | $C_6H_4-m-CH_3$ | H |
| $\underset{O}{\overset{O}{SC_2H_4OCCH_3}}$ | s-pyridyl | $4-SC_2H_4OCCH_3$ | $C_6H_5$ | H | $CH_2CH=CH_2$ |
| $SC_6H_{11}$ | H | $4-SC_6H_{11}$ | $C_6H_4-p-OCH_3$ | $C_6H_5$ | $C_2H_5$ |
| benzoxazolyl | $NO_2$ | H | $C_6H_5$ | $CH_2C_6H_5$ | H |
| triazolyl | s-pyrimidinyl | H | $C_6H_4-p-OCH_3$ | $C_6H_5$ | $C_2H_5$ |
| benzothiazolyl | CN | H | $C_6H_5$ | $C_6H_4-p-CH_3$ | $CH_3$ |
| thiazolopyridyl | CN | 4-S-pyridyl | $C_6H_5$ | $CH_2CH_2C_6H_5$ | H |

TABLE 6-continued

| X | Y | Z | R¹ | R² | R³ |
|---|---|---|-----|-----|-----|
| ![pyrimidine-thiol] | COOCH₃ | H | C₆H₅ | CH₃ | H |
| ![N-CH₃ triazole-SC] | CN | H | C₆H₅ | C₆H₄—p-CH₂CH₂OH | H |
| ![thiadiazole-NHCOCH₃] | CN | H | C₆H₄—p-NHCOCH₃ | C₆H₅ | C₂H₅ |
| NO₂ | H | H | C₆H₅ | C₆H₄—p-CH₃ | H |
| CN | H | 4-CN | C₆H₅ | C₆H₄—m-NHCOCH₃ | H |
| SO₂CH₂CH₃ | H | 4-SO₂CH₂CH₃ | C₆H₅ | C₆H₄—o-CH₃ | H |
| SO₂NHCH₃ | H | 4-SO₂CH₃ | C₆H₅ | C₆H₄—m-F | H |
| SO₂CH₃ | H | 4-SO₂CH₃ | C₆H₅ | C₆H₄—m-CH₃ | H |
| SO₂C₆H₅ | H | 4-SO₂C₆H₅ | C₆H₅ | C₆H₄—m-OCH₃ | C₂H₅ |
| CN | NO₂ | 4-Cl | C₆H₅ | CH₂C₆H₅ | C₂H₅ |
| SCN | CHO | 4-Cl | C₆H₄—p-OCH₃ | CH₃ | CH₃ |
| CN | H | 4-Br | C₆H₅ | CH₃ | C₂H₅ |
| s-pyridyl | CH₃ | 4-OCH₃ | C₆H₄—p-OCH₃ | C₆H₅ | CH₃ |
| CN | Cl | 4-CN | C₆H₅ | C₆H₅ | CH₃ |
| s-pyrimidinyl | H | 4-CN | C₆H₄—p-OCH₃ | C₆H₅ | H |
| CN | H | 4-CONH₂ | C₆H₅ | C₆H₅ | H |
| CN | H | 4-CON(C₂H₅)₂ | C₆H₄—p-OCH₃ | C₆H₄—p-OCH₃ | CH₂CH₂CH₃ |
| CN | H | 4-SO₂N(C₂H₅)₂ | C₆H₅ | CH₂CH₂CH₃ | C₂H₅ |
| CN | H | 4-SCN | C₆H₄—p-CH₃ | CH(CH₃)C₂H₅ | H |
| CN | H | 4-SCH₃ | C₆H₄—p-Cl | C₆H₁₁ | C₂H₅ |
| CN | H | 4-CN | C₆H₁₁ | C₆H₁₁ | CH₃ |
| SC₆H₅ | H | 4-CN | C₆H₄—p-NHCOCH₃ | C₆H₄—p-NHCOCH₃ | CH₃ |
| SC₄H₉—n | H | 4-CN | C₆H₄—m-Cl | C₆H₄—p-CH | CH₃ |
| CN | C₆H₅ | 4-CN | C₆H₄—o-Cl | C₆H₄—m-CH₃ | CH₃ |
| CN | CN | 4-CN | C₆H₄—p-Br | C₆H₄—m-CH₃ | CH₃ |
| NO₂ | H | H | C₆H₁₁ | CH₃ | CH₃ |

TABLE 7

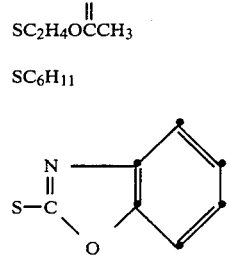

| X | Y | Z | R¹ | R² |
|---|---|---|---|---|
| H | H | H | CH₃ | H |
| CH₃ | H | H | C₄H₉—n | H |
| CN | H | H | C₃H₇—n | CH₃ |
| SCH₃ | Cl | H | C₂H₅ | C₂H₅ |
| CN | H | H | Ph | C₆H₁₁ |
| CN | Br | H | OCH₃ | CH₂Ph |
| Cl | NO₂ | 4-Br | OC₃H₇—n | CH₂CH₂OH |
| Br | CHO | 4-Br | H | Ph—p-Cl |
| SO₂CH₃ | CN | 5-SO₂CH₃ | H | Ph—p-CH₃ |
| SO₂CH₃ | H | 4-SO₂CH₃ | CH₃ | Ph—p-OCH₃ |
| SO₂CH₃ | H | 4-SO₂CH₃ | Ph | Ph—o,p-di-CH₃ |
| SO₂C₆H₅ | H | H | CH₃ | H |
| SC₂H₄OH | I | H | C₄H₉—n | H |
| SC₆H₅ | H | 4-Cl | C₃H₇—n | CH₃ |
| SO₂C₆H₅ | H | 4-SO₂C₆H₅ | C₂H₅ | C₂H₅ |
| CN | SCH₃ | 4-CN | Ph | C₆H₁₁ |
| CH₃ | NO₂ | H | OCH₃ | CH₂Ph |
| CN | H | H | OC₃H₇—n | CH₂CH₂OH |
| OCH₃ | SO₂CH₃ | H | H | Ph—p-Cl |
| SC₆H₄—m-CH₃ | SC₆H₅ | H | H | Ph—p-CH₃ |
| CN | H | H | CH₃ | Ph—p-OCH₃ |
| C₆H₅ | SC₆H₁₁ | H | Ph | Ph—o,p-di-CH₃ |
| CN | H | H | CH₃ | H |
| CN | H | 4-CN | C₄H₉—n | H |
| CONH₂ | CN | 4-CN | C₃H₇—n | CH₃ |
| CONHC₂H₅ | CN | 4-CN | C₂H₅ | C₂H₅ |
| CON(C₂H₅)₂ | CN | 4-CN | Ph | C₆H₁₁ |
| CN | H | 4-CN | OCH₃ | CH₂Ph |
| CN | SO₂CH₃ | 4-CN | OC₃H₇—n | CH₂CH₂OH |
| SO₂CH₃ | H | 4-SO₂CH₃ | H | Ph—p-Cl |
| SO₂N(CH₃)₂ | SO₂C₆H₅ | 4-SO₂CH₃ | H | Ph—p-CH₃ |
| SO₂C₄H₉—n | H | 4-SO₂C₄H₉—n | CH₃ | Ph—p-OCH₃ |
| SC₂H₄OH | H | 4-SC₂H₄OH | Ph | Ph—o,p-di-CH₃ |
| NO₂ | CO₂CH₃ | 5-CO₂CH₃ | CH₃ | H |
| SCH₃ | CO₂C₂H₅ | 5-CN | C₄H₉—n | H |
| CHO | CO₂C₂H₅ | 5-CN | C₃H₇—n | CH₃ |
| COOCH₃ | H | 4-OC₂H₅ | C₂H₅ | C₂H₅ |
| H | CN | 5-CN | Ph | C₆H₁₁ |
| SO₂C₆H₅ | H | 4-SO₂C₆H₅ | OCH₃ | CH₂Ph |
| SO₂C₆H₅ | H | 4-CH₃ | OC₃H₇—n | CH₂CH₂OH |
| SO₂C₆H₄—p-Cl | H | 4-SO₂C₆H₄—p-Cl | H | Ph—p-Cl |
| SO₂C₆H₄—p-CH₃ | H | 4-SO₂C₆H₄—p-CH₃ | H | Ph—p-CH₃ |
| SO₂C₆H₄—m-OCH₃ | SO₂C₆H₁₁ | 4-SO₂C₆H₄—m-OCH₃ | CH₃ | Ph—p-OCH₃ |
| SO₂CH₂CH₂CN | H | 4-SO₂CH₂CH₂CN | Ph | Ph—o,p-di-CH₃ |
| SO₂CH₂C₆H₅ | H | 4-SO₂CH₂C₆H₅ | CH₃ | H |
| SC₂H₄OCCH₃ (O) | s-pyridyl | 4-SC₂H₄OCCH₃ (O) | C₄H₉—n | H |
| SC₆H₁₁ | H | 4-SC₆H₁₁ | C₃H₇—n | CH₃ |
|  | NO₂ | H | C₂H₅ | C₂H₅ |
| 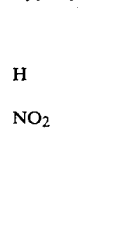 | s-pyrimidinyl | H | Ph | C₆H₁₁ |

TABLE 7-continued

[Structure diagram showing dye with X, Y, Z, R¹, R² substituents on an azo-pyrazole framework]

| X | Y | Z | R¹ | R² |
|---|---|---|----|----|
| [benzothiazol-2-yl-thio] | CN | H | OCH₃ | CH₂Ph |
| [pyridin-2-yl-thio] | CN | 4-[pyridin-4-yl-thio] | OC₃H₇—n | CH₂CH₂OH |
| [pyrimidin-2-yl-thio] | COOCH₃ | H | H | Ph—p-Cl |
| [1-methyl-1,2,4-triazol-3-yl-thio] | CN | H | H | Ph—p-CH₃ |
| —S—C(=N)—C(NHCOCH₃)=N (thiadiazole) | CN | H | CH₃ | Ph—p-OCH₃ |
| NO₂ | H | H | Ph | Ph—o,p-di-CH₃ |
| CN | H | 4-CN | CH₃ | H |
| SO₂CH₂CH₃ | H | 4-SO₂CH₂CH₃ | C₄H₉—n | H |
| SO₂NHCH₃ | H | 4-SO₂CH₃ | C₃H₇—n | CH₃ |
| SO₂CH₃ | H | 4-SO₂CH₃ | C₂H₅ | C₂H₅ |
| SO₂C₆H₅ | H | 4-SO₂C₆H₅ | Ph | C₆H₁₁ |
| CN | H | 4-Cl | OCH₃ | CH₂Ph |
| SCN | NO₂ | 4-Cl | OC₃H₇—n | CH₂CH₂OH |
| CN | H | 4-Br | H | Ph—p-Cl |
| s-pyridyl | CHO | 4-OCH₃ | H | Ph—p-CH₃ |
| CN | H | 4-CN | CH₃ | Ph—p-OCH₃ |
| s-pyrimidinyl | H | 4-CN | Ph | Ph—o,p-di-CH₃ |
| CN | CH₃ | 4-CN | CH₃ | H |
| CN | Cl | 4-CN | C₄H₉—n | H |
| CN | H | 4-CONH₂ | C₃H₇—n | CH₃ |
| CN | H | 4-CON(C₂H₅)₂ | C₂H₅ | C₂H₅ |
| CN | H | 4-SO₂N(C₂H₅)₂ | Ph | C₆H₁₁ |
| CN | H | 4-SCN | OCH₃ | CH₂Ph |
| CN | H | 4-SCH₃ | OC₃H₇—n | CH₂CH₂OH |
| SC₆H₅ | H | 4-CN | H | Ph—p-Cl |
| SC₄H₉—n | H | 4-CN | H | Ph—p-CH₃ |
| CN | C₆H₅ | 4-CN | CH₃ | Ph—p-OCH₃ |
| CN | CN | 4-CN | Ph | Ph—o,p-di-CH₃ |
| NO₂ | H | H | CH₃ | H |

The invention has been described in detail with particular reference to preferred embodiments thereof, but it will be understood that variations and modifications will be effected within the spirit and scope of the invention.

We claim:

1. A dye of the formula

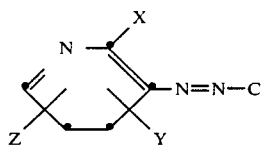

wherein X, Y, and Z are independently selected from hydrogen, halogen and cyano, and C is a coupler of the formula

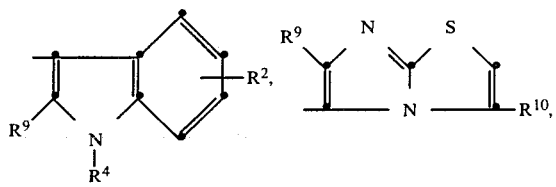

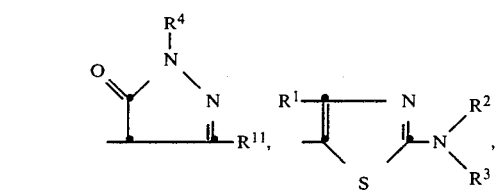

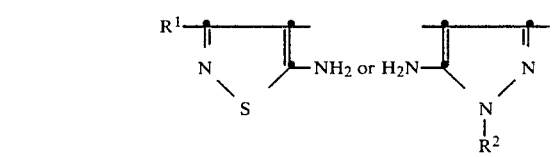

wherein $R^1$, $R^2$, $R^3$, $R^{10}$, and $R^{11}$ are independently selected from hydrogen and alkyl, and $R^4$ and $R^9$ are each selected from hydrogen and phenyl.

2. A dye according to claim 1 wherein the coupler has the structure

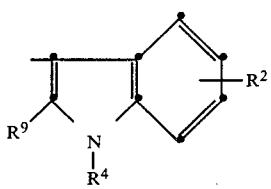

wherein $R^2$, $R^4$, and $R^9$ are defined therein.

3. A dye according to claim 1 wherein the coupler has the structure

wherein $R^9$ and $R^{10}$ are defined therein.

4. A dye according to claim 1 wherein the coupler has the structure

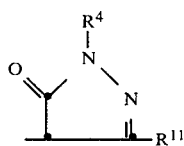

wherein $R^4$ and $R^{11}$ are defined therein.

5. A dye according to claim 1 wherein the coupler has the structure

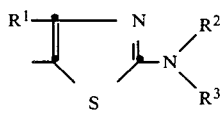

wherein $R^1$, $R^2$, and $R^3$ are defined therein.

6. A dye according to claim 1 wherein the coupler has the structure

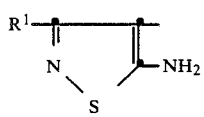

wherein $R^1$ is defined therein.

7. A dye according to claim 1 wherein the coupler has the structure

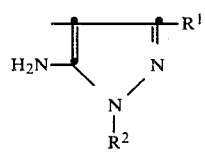

wherein $R^1$ and $R^2$ are defined therein.

8. The dye according to claim 1 having the formula

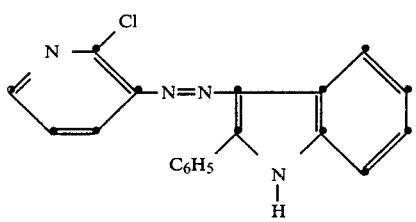

9. The dye according to claim 1 having the formula

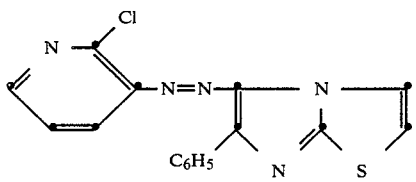

10. The dye according to claim 1 having the formula

11. The dye according to claim 1 having the formula
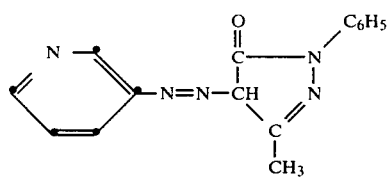
12. The dye according to claim 1 having the formula
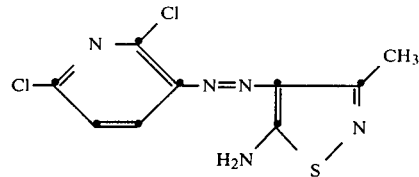
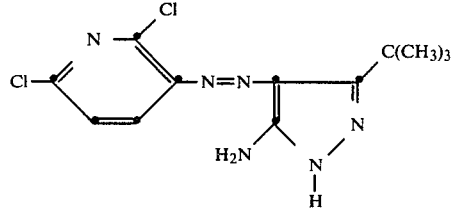
* * * * *